(12) United States Patent
Hua et al.

(10) Patent No.: US 8,329,064 B2
(45) Date of Patent: Dec. 11, 2012

(54) WATER-SOLUBLE SELF-ACID-DOPED POLYANILINE BLENDS

(75) Inventors: Mu-Yi Hua, Tao-Yuan (TW); Hung-Wei Yang, Tao-Yuan (TW); Rung-Ywan Tsai, Kaohsiung (TW); Ruey-Chi Hsu, Tao-Yuan (TW)

(73) Assignee: Chang Gung University, Tao-Yuan (TW)

( * ) Notice: Subject to any disclaimer, the term of this patent is extended or adjusted under 35 U.S.C. 154(b) by 351 days.

(21) Appl. No.: 12/773,405

(22) Filed: May 4, 2010

(65) Prior Publication Data

US 2011/0101282 A1    May 5, 2011

(30) Foreign Application Priority Data

Nov. 2, 2009    (TW) ............................... 98137271 A

(51) Int. Cl.
    *H01B 1/12*    (2006.01)
(52) U.S. Cl. ...................................................... 252/500
(58) Field of Classification Search .................. 252/500; 528/210–214, 422
    See application file for complete search history.

(56) References Cited

U.S. PATENT DOCUMENTS

2005/0035335 A1*    2/2005    Han et al. ...................... 252/500

OTHER PUBLICATIONS

Chen et al "Synthesis of water-soluble self-acid doped polyaniline", J. Am. Che. Soc. 1994, 116, 7939-7940.*
Yang et al., "A new drug of BCNU bound on magnetic nano-particles and their in vitro antitumor activity against Glioma C6 cells," 2009 IEEE International Magnetics Conference, May 4-8, 2009.

* cited by examiner

*Primary Examiner* — Mark Kopec
(74) *Attorney, Agent, or Firm* — Muncy, Geissler, Olds & Loe, PLLC

(57) ABSTRACT

The present invention provides a water-soluble self-acid-doped polyaniline blends, comprising a 70-90% weight percentage polyaniline derivative and 10-30% weight percentage at least a water-soluble polymer. The blend can be used to produce a conductive polymer film and/or a conductive-polymer composite film. In the present invention, a water-soluble self-acid-doped polyaniline derivative is blended with a water-soluble polymer to enhance the mechanical properties and the coating-to-substrate adhesion of the electric conductive polymer film or the electric conductive-polymer composite film, and increase the conductivity of the blender. In addition, the blend containing a water-soluble self-acid-doped polyaniline of the present invention is biotoxicity-free and has free radical-capture capability. Thus it can be used as a biocompatible and conductive biomedical material.

6 Claims, 16 Drawing Sheets

WATER-SOLUBLE SELF-ACID-DOPED POLYANILINE BLENDS

BACKGROUND OF THE INVENTION

1. Field of the Invention

The present invention relates to a polyaniline derivative, particularly to a water-soluble self-acid-doped polyaniline blends.

2. Description of the Related Art

Polyaniline has a structure expressed by the following general formula:

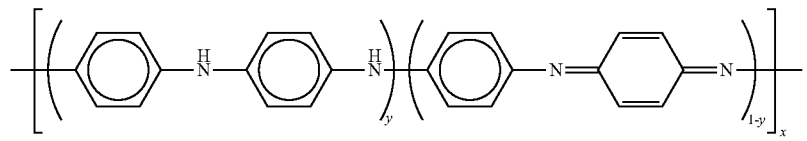

wherein y=1–0 (*Faraday Discuss Chem. Soc.*, 88 (1989) 317).

Polyaniline is a conjugate conductive polymer. The so-called conjugate conductive polymer has conjugate single bonds and double bonds alternately arranged on the backbone, whereby electrons can move along the molecular chain or across the molecular chains, wherefore a conjugate conductive polymer can conduct electricity. A conjugate conductive polymer has a very wide range of electric conductivity: from $10^{-12}$-$10^{-9}$ S/cm in an undoped state to more than $10^3$ S/cm in a doped state, which spans a range as huge as $10^{12}$-$10^{15}$ times and covers the electric conductivities of insulating materials, semiconductors and conductors. The dopant concentration determines the conductivity of a conjugate conductive polymer. Most of conjugate conductive polymers are doped with external ions. The doping speed thereof is usually determined by the speed that the dopant ions diffuse in the polymer. However, a self-doped polyaniline does not need external dopant ions. When positive charges are introduced into the π-electron system of the backbone of the polymer, the positive charges can be offset by emigrating protons out of the polymer. Such a proton-hopping mechanism has ions with the smallest size and the highest mobility, which can provide a very high doping efficiency, prevent from ion loss and increase the stability of electric conduction.

Among conjugate conductive polymers, polyaniline has the following advantages: (1) it is made of a low-cost monomer and easy to synthesize; (2) it has superior stability in air and water; (3) its conductivity can be modified by doping a proton acid (not involving gain and loss of electrons) in addition to by a redox reaction (*J. Chem. Soc., Faraday Trans.*, 82, 2385 (1986).; *Macromolecules*, 24, 1242 (1991).; *Synth. Met.*, 13, 193 (1986)). Therefore, polyaniline has a very high potential. For examples, polyaniline may used as an electrode material because of the redox characteristic thereof; polyaniline may apply to a pH sensor because of the proton-exchange characteristic thereof; polyaniline can apply to a display because the electrochromic characteristic thereof. As polyaniline is very stable in air, it has been widely used in conductive plastics and the corrosion prevention engineering of ferrous and non-ferrous metals. Although polyaniline has many advantages, it also has disadvantages of low solubility and poor workability caused by the hardness and brittleness thereof. The disadvantages limit the application of polyaniline. The solubility of polyaniline can be improved via appropriately selecting the dopant agent thereof. Polyaniline can be blended with another polymeric material to improve the mechanical properties thereof. Nevertheless, polyaniline only dissolve in few organic solvents, such as NMP and DMSO. Therefore, the modification of polyaniline needs further researches.

Supercritical carbon dioxide has physical and chemical properties between those of the liquid phase and vapor phase of carbon dioxide. Therefore, supercritical carbon dioxide has the characteristics of gas and liquid simultaneously. Its viscosity resembles that of gas. However, its density, the spacing between its molecules, and its ability to dissolve materials are near those of liquid. Because of low viscosity, the transportation of supercritical carbon dioxide consumes less power than that of liquid. As supercritical carbon dioxide has a diffusion coefficient one hundred times that of liquid, it possesses superior mass transfer ability. As supercritical carbon dioxide almost has no surface tension, it has superior penetration ability and thus can easily penetrate a porous matter. Besides, carbon dioxide has characteristics of high chemical stability, non-toxicity, odorlessness, incombustibility, low cost, and high availability. Further, the critical pressure and critical temperature of carbon dioxide are not too high to economically reach. Therefore, supercritical carbon dioxide is very environment-friendly and economic-efficient. Supercritical carbon dioxide can apply to the fields of extraction, separation, cleaning, encapsulation, infusion, granulation and reaction.

Supercritical fluid has been applied to the reaction or modification of polymers. For example, Said-Galiyev, et al. performed a reaction of a diacid anhydride and a diamine in supercritical carbon dioxide at a temperature of 130-180° C. and under a pressure of 325 Bar to synthesize a polyimide; they also studied the relationship between the molecular weight of polyimide and the reaction conditions, wherein the molecular weight is determined with a viscosity method. The found that the following two factors influence the molecular weight of polyimide: (1) the molecular weight of polyimide obtained in a continuous-type reactor is greater than that obtained in a batch-type reactor; (2) the molecular weight increases with the reaction time (*J. of Supercritical Fluids*, 26, 147 (2003)). Tang, et al. soaked PPy (polypyrrole) and PS (polystyrene) in $ScCO_2$ (supercritical $CO_2$) at a temperature of 40° C. and under a pressure of 10.5 MPa for 1, 2, 3, 4, 9, 16, and 24 hours to synthesize PPy-PS composite films. The PPy-PS composite film obtained in the 24-hour soaking process has the best quality. When the PPy-PS composite film is doped by adding appropriate amount of $FeCl_3$, the electric conductivity thereof can reach as high as $10^{-2}$ S/cm (*European Polymer Journal*, 39, 143 (2003)). Erkey, et al. used $I_2$, which is soluble in supercritical carbon dioxide, as the oxidant. They soaked $I_2$ and PU (polyurethane) in $ScCO_2$ at a temperature of 50° C. and under a pressure of 13.7 MPa for 24 hours to implant the oxidant into PU. Next, they took out the PU and placed the PU in vacuum drying chambers. Next, they respectively filled PPy vapor into the vacuum drying chambers at temperatures of 0° C. and 21° C. and let PU react with PPy for 48 hours to form PPy-PU copolymers having fine workability and appropriate electric conductivities. The PPy- PU copolymers respectively have electric conductivities of $10^{-4}$ and $10^{-2}$ S/cm. When the PPy-PU copolymer is synthesized at the lower temperature, the content of PPy in the PPy-PU copolymer is increased by 20%, and the electric conductivity thereof is also increased (*J. of Supercritical Fluids*, 28, 233 (2004)). Satoshi, et al. mixed LA (lactic acid), DCC(N,N-dicyclohexy-carbodimide) and DMAP (4-dimethylamino pyridine) and synthesized PLLA (poly($_L$-lactic acid)) with the following three methods: (1) they heated LA to a temperature of 150° C. to become a melt-solid phase; then added DCC and DMAP into LA to synthesize PLLA; (2) they dissolved LA, DCC and DMAP in $ScCO_2$ at a temperature of 80° C. and under a pressure of 3000 psig to synthesize PLLA; (3) they dissolved LA, DCC and DMAP in dicholomethane to synthesize PLLA. As the reactions of Method (2) and Method (3) took place in a homogenous phase, the PLLA of the two methods have higher molecular weights. As $ScCO_2$ is non-toxic, harmless and recyclable, Method (2) is more environment-friendly and has higher economic-efficiency (*Polymer*, 45, 7839 (2004)).

Accordingly, the present invention synthesizes a water-soluble self-acid-doped polyaniline derivative in supercritical carbon dioxide, wherein the condensed aqueous solution of the polyaniline derivative can be directly cast into a film or coated on various substrates. The film has an electric conductivity of $10^{-4}$ S/cm, which meets the requirements of an ESD-prevention material ($10^{-5}$ S/cm) and an antistatic material ($10^{-6}$ S/cm).

SUMMARY OF THE INVENTION

One objective of the present invention is to provide a water-soluble self-acid-doped polyaniline blends, wherein the water-soluble self-acid-doped polyaniline derivative is blended with a water-soluble polymer to improve the mechanical properties, coating-to-substrate adhesion and electric conductivity of the blends.

Another objective of the present invention is to provide a water-soluble self-acid-doped polyaniline blends, wherein the blends have free radical-capture capability and non-biotoxicity, wherefore the blends can function as a conductive, biocompatible and anti-oxidation biomedical material.

To achieve the abovementioned objectives, the present invention proposes a water-soluble self-acid-doped polyaniline blends. The blends of the present invention comprise 70-90 wt % the water-soluble self-acid-doped polyaniline derivative of the present invention and 10-30 wt % at least one water-soluble polymer. The water-soluble self-acid-doped polyaniline derivative of the present invention can be expressed by Formula (I):

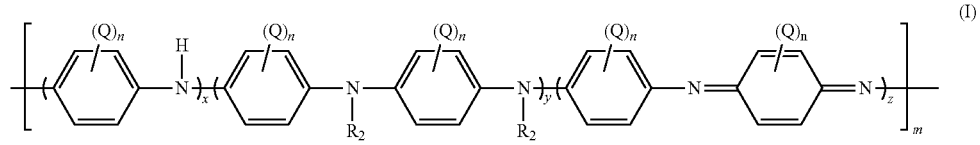

wherein m is a natural number, and
wherein n is a positive integer of from 1 to 4, and
wherein x, y or z is 0 or 1 independently in each of the m pieces of substructures of Formula (I), and
wherein x, y and z cannot be 0 simultaneously in each of the m pieces of substructures, and wherein y is 1 in at least one of the m pieces of substructures, and
wherein Q is an atom or a functional group selected from a group consisting of fluorine, chlorine, bromine, —$OR_1$, —$COR_1$, —$OCOR_1$, —$NHCOR_1$, —$NO_2$, —$COOR_1$, —CN and —COOH, and
wherein $R_1$ is a $C_1$-$C_4$ alkyl group, and
wherein $R_2$ is a functional group expressed by Formula (II):

wherein A is a substituted or unsubstituted $C_1$-$C_4$ alkylidene group, and
wherein M is an atom or a functional group selected from a group consisting of hydrogen, lithium, sodium, potassium and $NH_4^+$.

The polyaniline derivative of the present invention has water-solubility and a self-acid-doped structure. The condensed aqueous solution of the polyaniline derivative can be cast into a film or coated on a substrate. The electric conductivity of the polyaniline derivative can reach as high as $10^{-4}$ S/cm. As the polyaniline derivative of the present invention is water-soluble, it can be blended with a conventional water-soluble polymer to form blends. The blends of the present invention can be widely used in the mechanical and electronic industries.

DETAILED DESCRIPTION OF THE INVENTION

Figure 1:
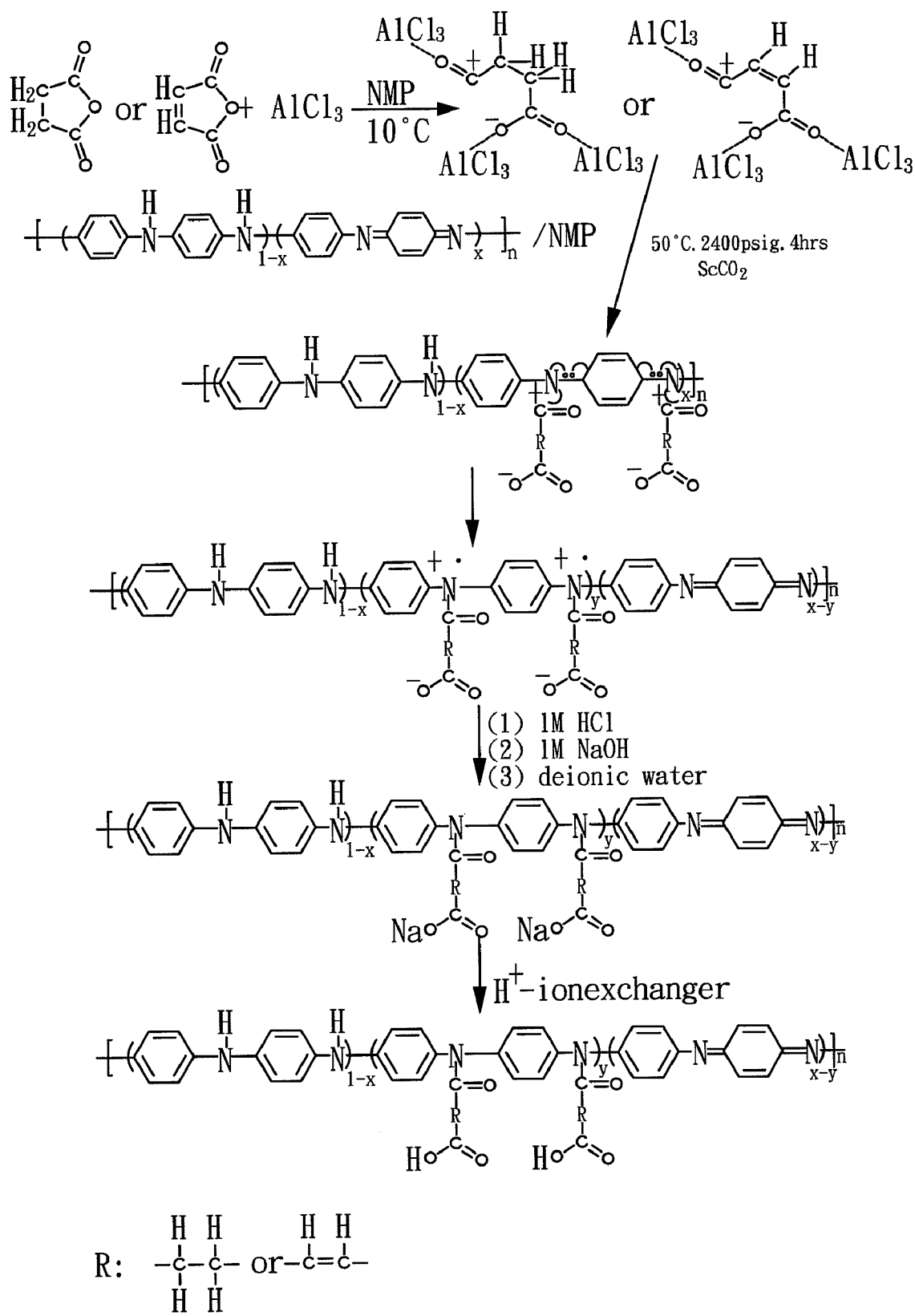
FIG. 1 is a diagram schematically showing the synthesis process of a polyaniline derivative according to one embodiment of the present invention.

The present invention proposes a water-soluble self-acid-doped polyaniline blends. The blends of the present invention comprises 70-90 wt % the water-soluble self-acid-doped polyaniline derivative of the present invention and 10-30 wt % at least one water-soluble polymer. The blends can be used to fabricate a conductive polymeric film or a conductive polymeric composite film. In a preferred embodiment, the blends of the present invention comprises 75-85 wt % the water-soluble self-acid-doped polyaniline derivative of the present invention and 15-25 wt % at least one water-soluble polymer.

The abovementioned water-soluble polymer refers to a polymeric material able to dissolve in water. The abovementioned water-soluble polymer may be but is not limited to polyvinyl alcohol, polyethylene oxide or polystyrene.

The water-soluble self-acid-doped polyaniline derivative of the present invention can be expressed by Formula (I):

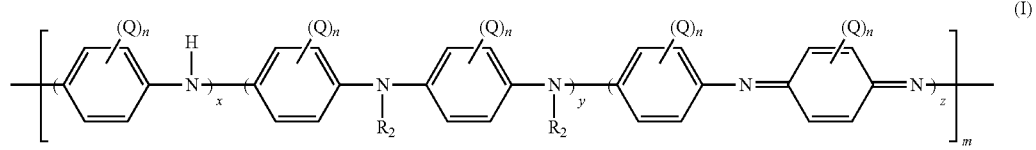

wherein m is a natural number, and
wherein n is a positive integer of from 1 to 4, and
wherein x, y or z is 0 or 1 independently in each of the m pieces of substructures of Formula (I), x, y and z cannot not be 0 simultaneously in each of the m pieces of substructures, and y is 1 in at least one of the m pieces of substructures, and
wherein Q is an atom or a functional group selected from a group consisting of fluorine, chlorine, bromine, —$OR_1$, —$COR_1$, —$OCOR_1$, —$NHCOR_1$, —$NO_2$, —$COOR_1$, —CN and —COOH, and wherein $R_1$ is a $C_1$-$C_4$ alkyl group, and
wherein $R_2$ is a functional group expressed by Formula (II):

wherein A is a substituted or unsubstituted $C_1$-$C_4$ alkylidene group, and
wherein M is an atom or a functional group selected from a group consisting of hydrogen, lithium, sodium, potassium and $NH_4^+$.

In a preferred embodiment, A is a $C_2$ or $C_3$ substituted or unsubstituted alkylidene group.

When m is greater than 1, Formula (I) has m pieces of substructures. For example, when m=2, 3, 4, 5, . . . , Formula (I) has 2, 3, 4, 5, . . . pieces of substructures.

The structure of the water-soluble self-acid-doped polyaniline derivative and the constituents of the blends have been described above. Below is described a method for fabricating the water-soluble self-acid-doped polyaniline derivative of the present invention.

Firstly, take an intramolecular acid anhydride compound to react with a Lewis acid to form a dual-carboxyl compound.

The abovementioned intramolecular acid anhydride compound refers to a compound containing an acid anhydride functional group inside the molecule. The acid anhydride functional group is formed via dehydrating and condensing two carboxyl functional groups. Therefore, the intramolecular acid anhydride compound is characterized in having a 4-7 cycle formed of the (C—O—C) of the acid anhydride functional group and 1-4 pieces of carbon chains connecting the two carboxyl functional groups. The cycle can react with the Lewis acid to open the acid anhydride functional group to form two carboxyl functional groups. The intramolecular acid anhydride compound may be but is not limited to the succinic anhydride or the maleic acid anhydride shown below.

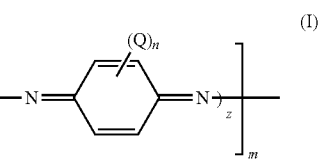 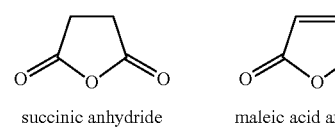

succinic anhydride    maleic acid anhydride

The abovementioned Lewis acid refers to a material familiar to the persons skilled in the art and able to hydrolyze an acid anhydride into two carboxyl functional groups. The Lewis acid may be but is not limited to aluminum chloride ($AlCl_3$) or boron trifluoride ($BF_3$).

Next, mix polyaniline and the dual-carboxyl compound. Before mixing, polyaniline may be dissolved in an inert solvent able to dissolve polyaniline. The solvent may be but is not limited to NMP (N-Methyl-2-Pyrrolidone) or DMSO (dimethyl sulfoxide). The dual-carboxyl compound, which is the product of the reaction between the intramolecular acid anhydride compound and the Lewis acid, may also be dissolved in the same solvent so that the dual-carboxyl compound can easily mix with polyaniline.

Next, place the mixture solution containing polyaniline and the dual-carboxyl compound in a supercritical carbon dioxide reaction tank and let polyaniline reacts with the dual-carboxyl compound in the supercritical carbon dioxide reaction tank. The supercritical carbon dioxide reaction tank has a pressure of 1800-2400 psig and a temperature of 40-50° C. This step is to let the nitrogen of the imido of polyaniline react with one carboxyl of the dual-carboxyl compound to achieve self acid doping.

After the reaction in the supercritical reaction tank is completed, take out the products, and place the products in a proton acid aqueous solution to precipitate the products. It is unnecessary to define the hydrogen ion concentration of the proton acid aqueous solution too strictly. The proton acid aqueous solution having a hydrogen ion concentration of about 1 M is sufficient to meet the requirement. The proton acid may be but is not limited to hydrochloric acid, formic acid, acetic acid or sulfuric acid.

Next, separate the precipitate from the solution and use a basic solution to re-dissolve the precipitate for undoping. Before the precipitate is re-dissolved, flush the precipitate with deionized water until the filtered liquid become neutral lest the residual proton acid in the precipitate react with the re-dissolved basic solution. It is unnecessary to define the hydroxyl ion concentration of the re-dissolved basic solution too strictly. The basic solution having a hydroxyl ion concentration of about 1 M is sufficient to meet the requirement. The basic material of the basic solution may be but is not limited to sodium hydroxide or ammonium hydroxide.

Next, the re-dissolved solution is desalted. Before desalting, the insoluble matters are filtered out beforehand. Desalting may be undertaken with a method familiar to the persons skilled in the art, such a dialytic method or a desalting column method. The desalted solution is processed with a hydrogen ion exchange resin, whereby hydrogen replaces the cation of the carboxyl function group of the polyaniline derivative. Then, remove the water of the filtered liquid with a dewatering method (such as a concentrating method) to obtain the polyaniline derivative of the present invention.

Below, the embodiments are used to demonstrate the water-soluble self-acid-doped polyaniline derivative and the blend containing the same of the present invention to make easily understood the present invention. However, it is not intended to limit the scope of the present invention.

Embodiment I Fabrication and Property Analysis of a Polyaniline Derivative SPAn2400 Na Refer to FIG. 1 for the synthesis process of a polyaniline derivative. Firstly, dissolve 0.30 g (0.83 mmol) polyaniline in 30 ml NMP (N-Methyl-2-Pyrrolidone), and dissolve 0.83 g (8.3 mmol) SA (Succinic Anhydride) in 10 ml NMP, and dissolve 0.55 g (4.15 mmol) aluminum chloride in 10 ml NMP, wherein the mole ratio of aluminum chloride and SA is 1/2. Next, gradually drip the NMP solution of aluminum chloride into the NMP solution of SA to undertake a reaction therebetween for 2 hours. Next, gradually drip the resultant solution into the NMP solution of polyaniline. Next, place the mixture solution in a supercritical reactor and undertake a reaction at a temperature of 50° C. and under a pressure of 2400 psig for 4 hours. Next, add the resultant solution into a 1M aqueous solution of HCl and agitate the mixture solution. Next, filter the mixture solution to obtain a precipitate. Next, flush the precipitate with deionized water until the flushing water presents neutrality. Next, place the precipitate in a 1M aqueous solution of NaOH to re-dissolve and undope the precipitate. Next, remove the residual precipitate from the resultant solution and dialyze the filtered solution with a dialysis membrane (Spectra/Por 3 membrane, molecular weight cutoff=3500) in deionized water. Thus is obtain a polyaniline Derivative-poly[N-(sodium 1-tone-butyrate)] aniline, which is denoted by SPAn2400 Na, and whose structure is shown in FIG. 1. SPAn2400 Na is water-soluble, and the aqueous solution thereof has a blue color. After having been fabricated into a solid-state film, SPAn2400Na has an electric conductivity of $3.7 \times 10^{-9}$ S/cm.

Figure 2:
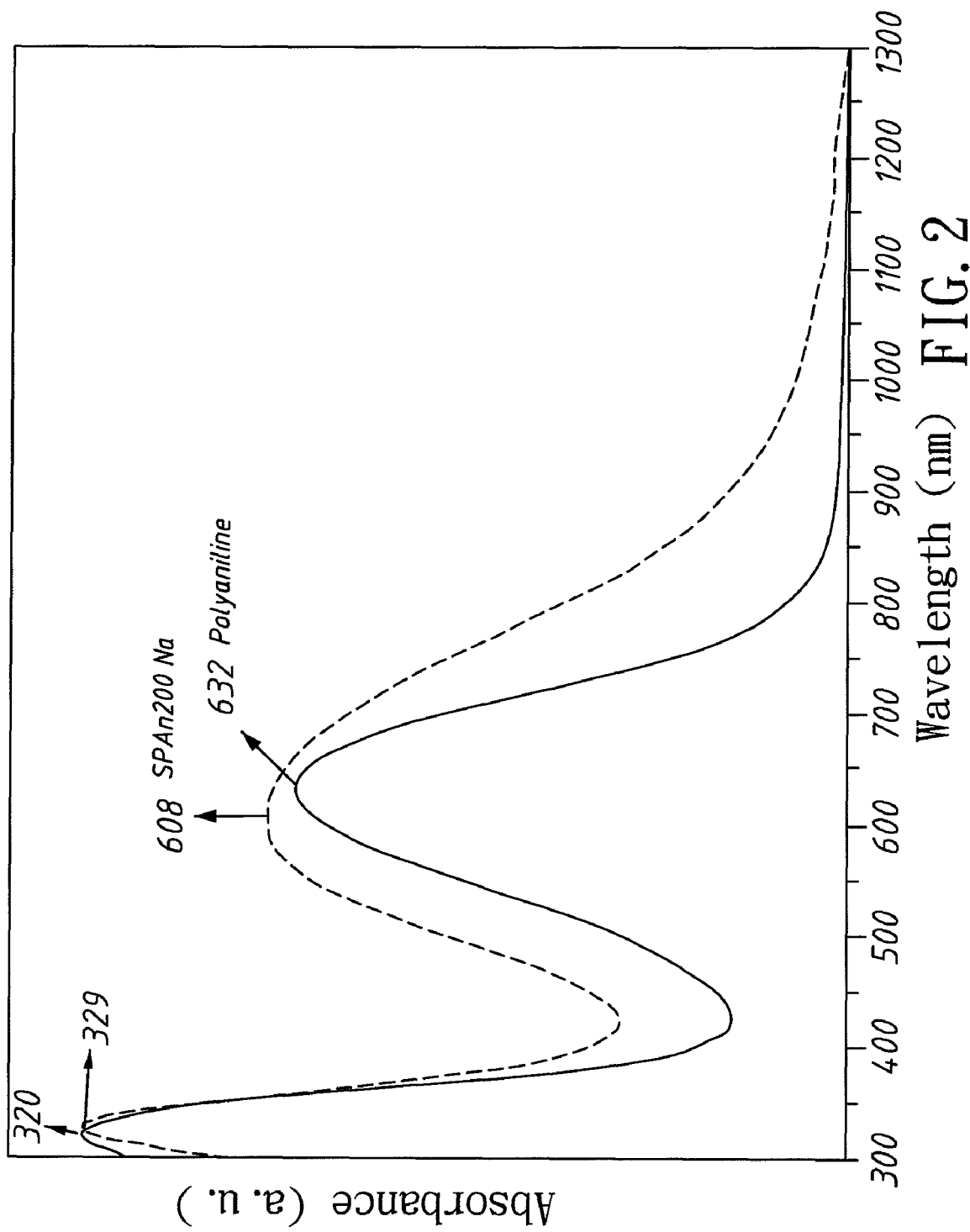
FIG. 2 shows the UV-VIS absorption spectra of polyaniline and SPAn2400 Na respectively dissolved in NMP and water according to one embodiment of the present invention.

FIG. 2 shows the UV-VIS absorption spectra of polyaniline and SPAn2400 Na respectively dissolved in NMP and water. From FIG. 1, it is known that the absorption positions of the benzene ring and the quinone ring respectively shift to shorter wavelengths by 9 nm and 24 nm. Such a phenomenon may be attributed to the addition of —RCOONa to the nitrogen on the polyaniline. —RCOONa varies the coplanarity of the polyaniline backbone and increases the torsion angle of the backbone. Thus is reduced the overlap between the orbit of the $\pi$ electrons on the benzene ring and the orbit of the non-bonding electrons of nitrogen. Then, electrons need more energy to transit through a benzene ring or transit from one backbone to another backbone. Therefore, the absorption peaks shift toward shorter wavelengths.

Figure 3:
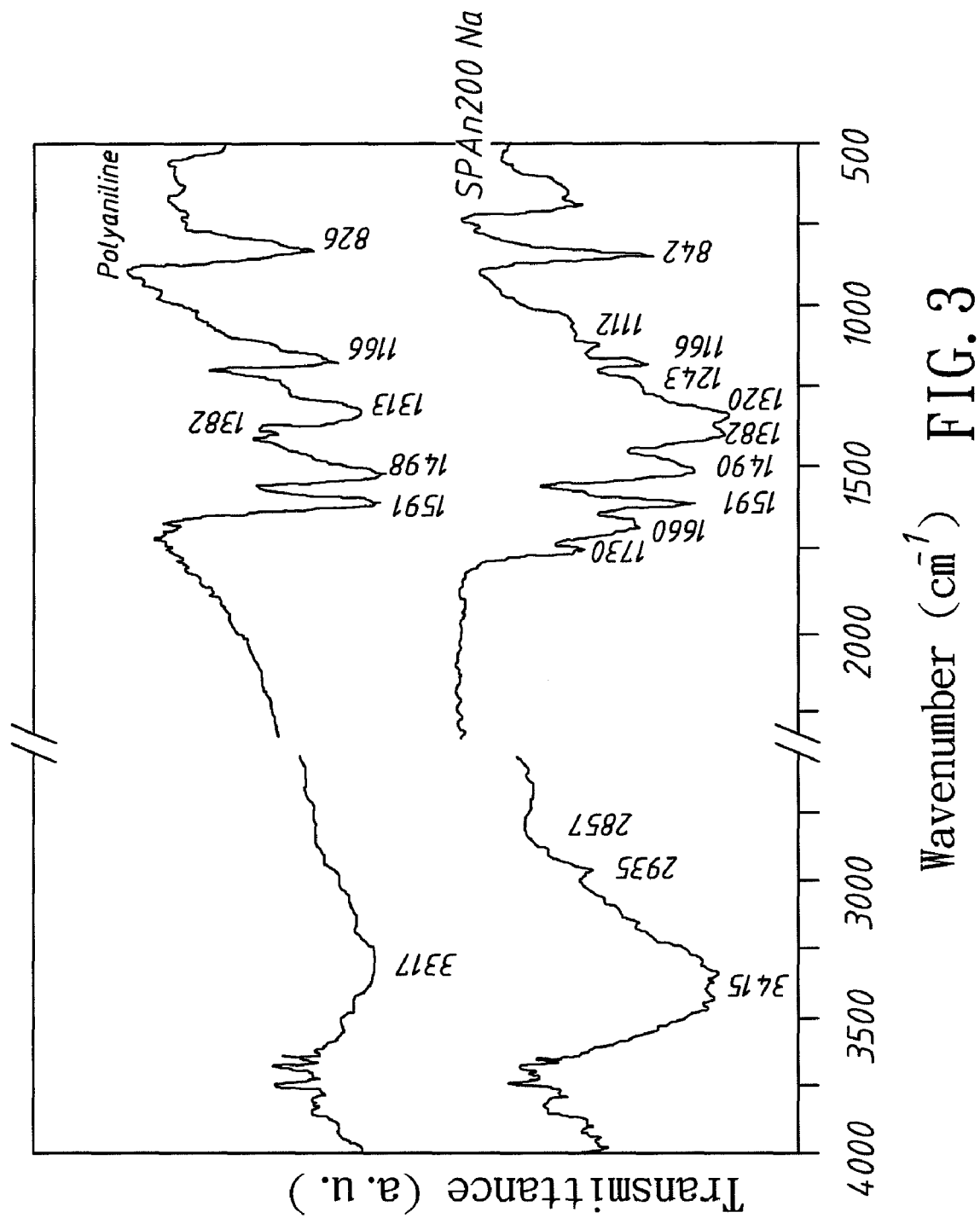
FIG. 3 shows the infrared spectra of the solid-state polyaniline and the solid-state SPAn2400 Na according to one embodiment of the present invention.

FIG. 3 shows the infrared spectra of the solid-state polyaniline and the solid-state SPAn2400 Na. In FIG. 3, there are saturated asymmetric and symmetric C—H stretching vibrations respectively at 2935 $cm^{-1}$ and 2827 $cm^{-1}$. It means that there are saturated alkyl functional groups in SPAn2400 Na. Further, there are stretching vibrations of C=O

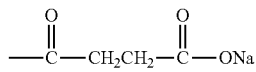

of —COONa, C=O of —CONH—, C—O of —COONa respectively at 1730 $cm^{-1}$, 1660 $cm^{-1}$, and 1243 $cm^{-1}$. Those evidences prove that the functional group of the salt of the opened cyclic sodium succinic acid anhydride is indeed connected to the nitrogen of polyaniline.

The C—H out-of-plane deformation of the 1,4-disubstituted benzene ring at 842 $cm^{-1}$ indicates that the benzene ring of the polyaniline derivative modified by succinic acid anhydride still has a 1,4-disubstitution without any addition reaction occurring in the benzene ring.

Figure 4:
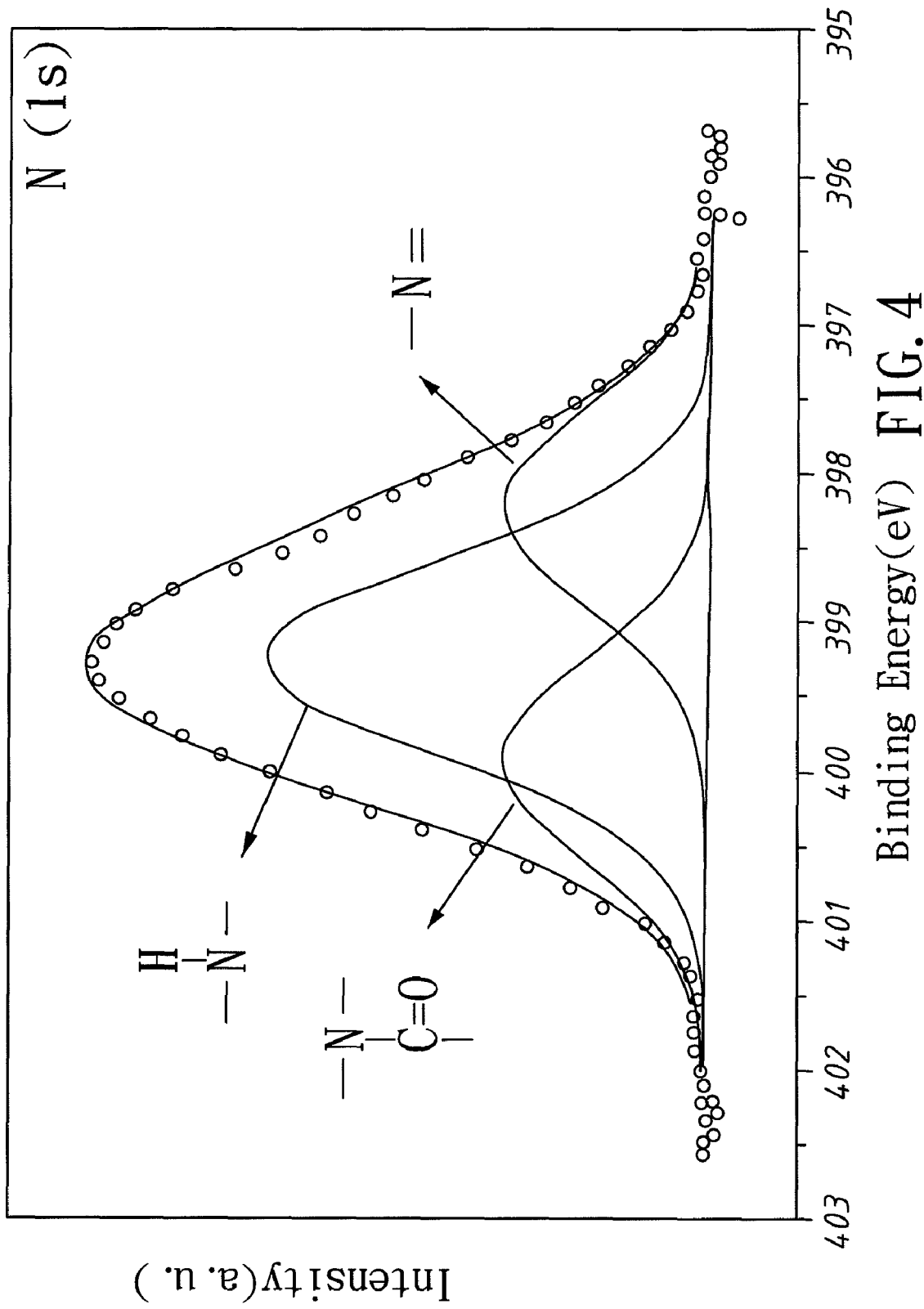
FIG. 4 shows the XPS N(1 s) spectra of SPAn2400 Na according to one embodiment of the present invention.

FIG. 4 shows the XPS N(1 s) spectra of SPAn2400 Na. The N of imine (—N=) has a peak at 398.2±0.1 eV; the N of amine

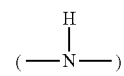

has a peak at 399.3±0.1 eV; the side chain-containing N of amine has a peak at 399.8±0.1 eV. The area ratio of the three spectra is 24.0/52.3/23.7, wherefrom it is known that the grafting ration is about 23.7%. The number of N's of amine does not change. Therefore, it is known that the side-chain functional groups are grafted on the N of imine.

Embodiment II Fabrication and Property Analysis of a Polyaniline Derivative SPAn2400 H Process an aqueous solution of SPAn2400 Na with a hydrogen ion exchange resin to replace sodium ion with hydrogen ion. Thus is obtained a polyaniline derivative—poly[N-(1-tone-butyric acid)]aniline, which is denoted by SPAn2400 Na, and whose structure is shown in FIG. 1. SPAn2400 H has a green aqueous solution. The condensed aqueous solution of SPAn2400 H can be cast into a film or coated on a substrate. The film of SPAn2400 H has an electric conductivity of $7.2 \times 10^{-4}$ S/cm, measured with a four-point probe method.

Figure 5:
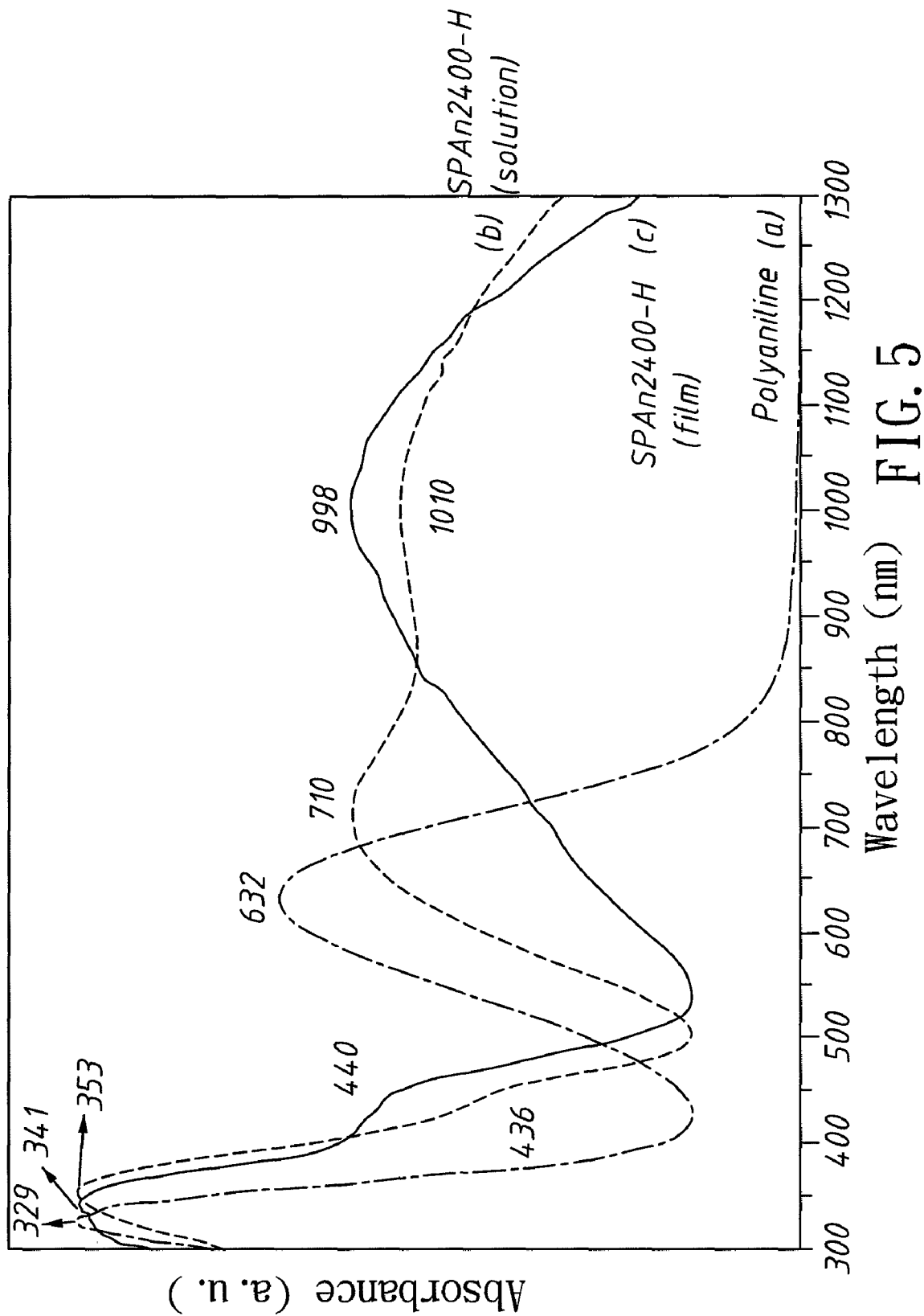
FIG. 5 shows the UV-VIS absorption spectra of polyaniline and SPAn2400 H in different states according to one embodiment of the present invention.

FIG. 5 shows the UV-VIS absorption spectra of polyaniline and SPAn2400 H in different states. The solution of SPAn2400 H has a green color, and the UV-VIS absorption spectra thereof is shown in line (b) of FIG. 5, wherein the absorption peak at 353 nm indicates the π-π* transition of a benzenoid ring; the absorption peaks at 436 nm and 1010 nm respectively indicate a polaron band transition and a bipolaron band transition. The aqueous solution of SPAn2400 H may be coated on a quartz plate to form a green film. The UV-VIS absorption spectra of the SPAn2400 H film is shown in line (c) of FIG. 5, which is similar to that of the SPAn2400 H solution and has three peaks respectively at 341 nm, 440 nm and 998 nm, wherein the peaks at 440 nm and 998 nm respectively indicate a polaron band transition and a bipolaron band transition.

Figure 6:
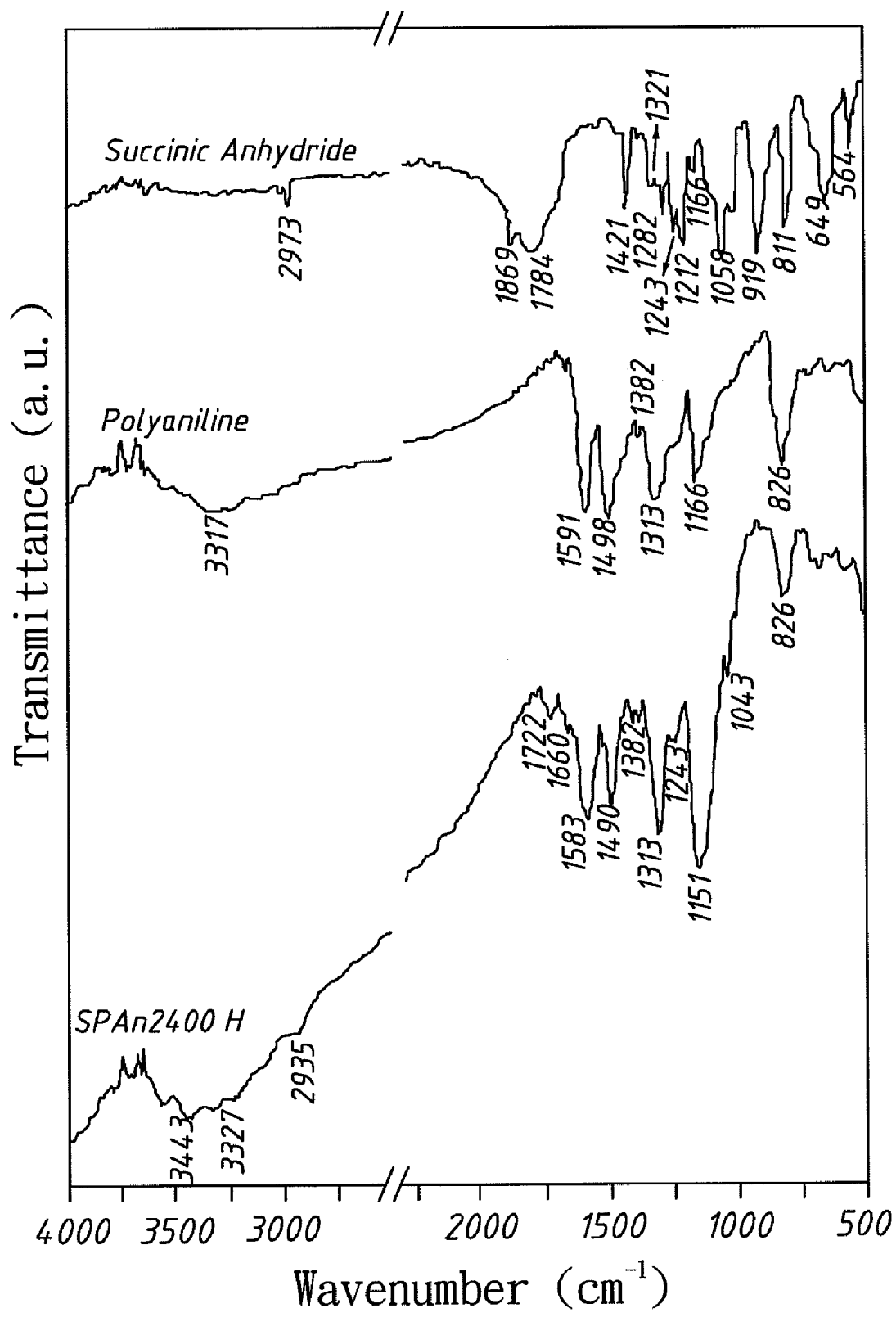
FIG. 6 shows the infrared spectra of polyaniline and SPAn2400 H according to one embodiment of the present invention.

FIG. 6 shows the infrared spectra of polyaniline and SPAn2400 H. In FIG. 6, there are stretching vibrations of C=O of —COOH, C=O of an amido functional group, C—O of —COOH respectively at $1722 \text{ cm}^{-1}$, $1660 \text{ cm}^{-1}$, and $1243 \text{ cm}^{-1}$. Those evidences prove that the functional group of the opened cyclic succinic acid anhydride is indeed connected to the nitrogen of polyaniline. As polarons perform non-local movements in the backbone, the absorption peaks originally at $1591 \text{ cm}^{-1}$ and $1498 \text{ cm}^{-1}$ shift to shorter wavelengths—$1583 \text{ cm}^{-1}$ and $1490 \text{ cm}^{-1}$. Because of protonation, the characteristic peak originally at $1166 \text{ cm}^{-1}$ shifts to $1151 \text{ cm}^{-1}$ and becomes fatter. As there is no external dopant, it is proved to be a self acid doping caused by —COOH. The self acid doping is also proved by FIG. 5. The C—H out-of-plane deformation of the 1,4-disubstituted benzene ring at $826 \text{ cm}^{-1}$ indicates that the benzene ring of the polyaniline derivative modified by succinic acid anhydride still has a 1,4-disubstitution without any addition reaction occurring in the benzene ring.

Figure 7:
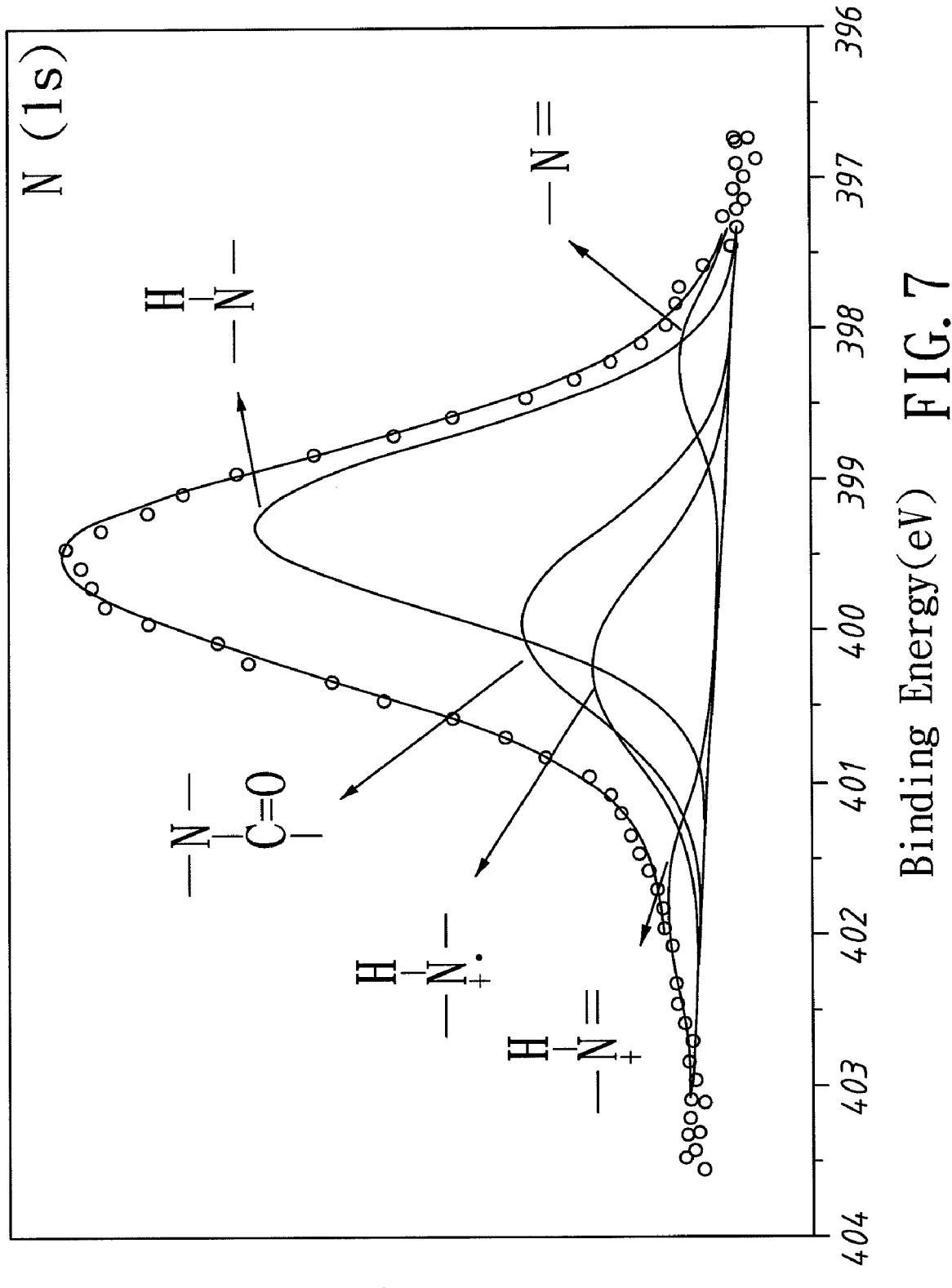
FIG. 7 shows the XPS N(1 s) spectra of SPAn2400 H according to one embodiment of the present invention.

FIG. 7 shows the XPS N(1 s) spectra of SPAn2400 H. The N of imine (—N=) has a peak at 398.2±0.1 eV; the N of amine

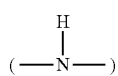

has a peak at 399.3±0.1 eV; the side chain-containing N of amine has a peak at 399.8±0.1 eV; the electron-hole pair-containing N of amine

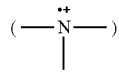

has a peak at 400.2±0.1 eV; the quaternary N

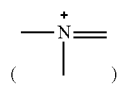

containing only a hole has a peak at 401.8±0.1 eV. The area ratio of the five spectra is 4.8/52.1/23.9/15.3/3.9. The peaks, which are respectively at 400.2±0.1 eV and 401.8±0.1 eV, result from the fact that the N of amine is self-acid-doped by the carboxyl functional group on the side chain. From the area ratio, it can be worked out that the ratio of self acid doping of SPAn2400 H is about 15.3%+3.9%=19.2%. This means that 4.8% (=23.9%-19.2%) R—COOH do not take part in self acid doping but still in a free-acid state.

Figure 8:
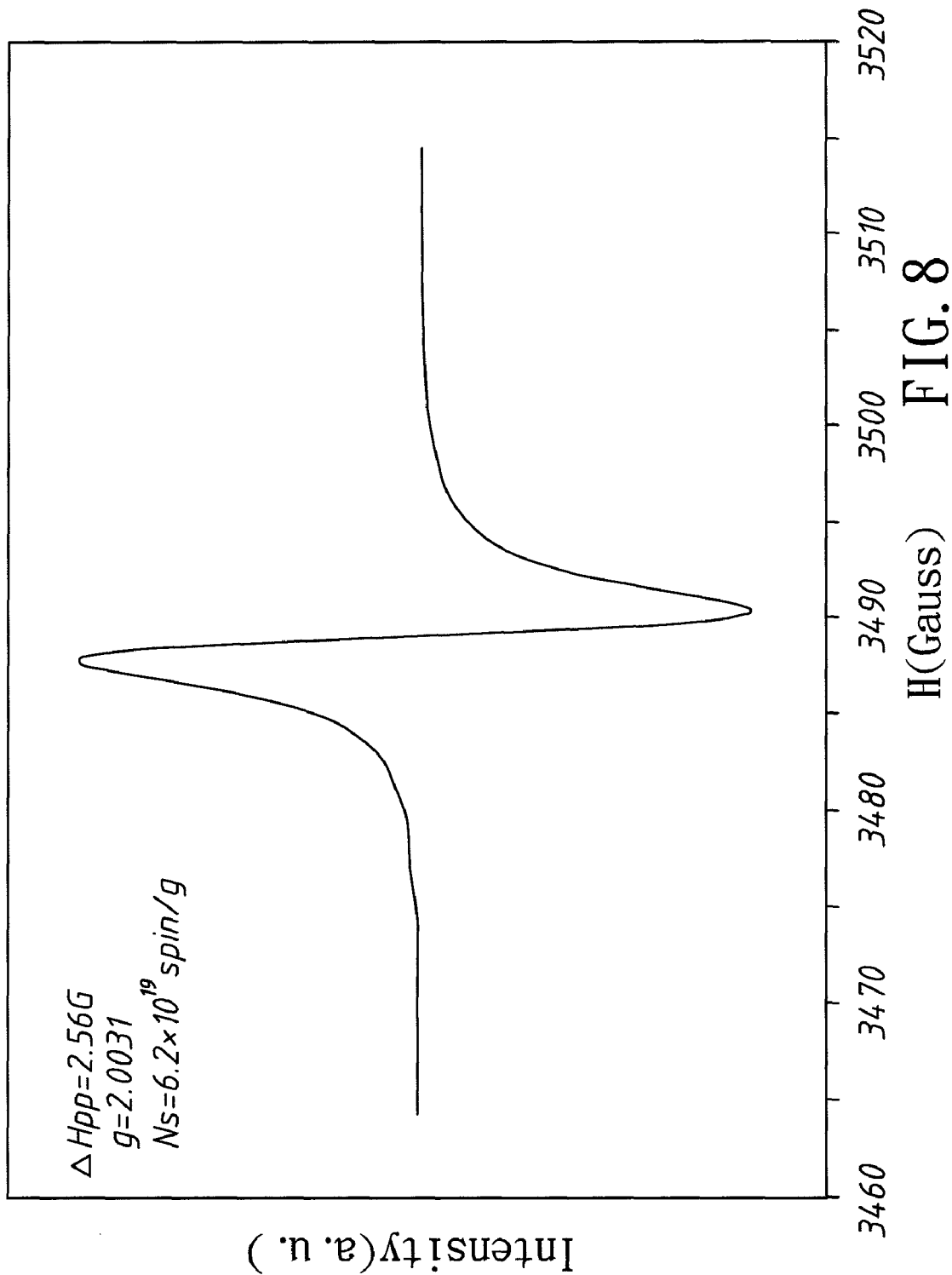
FIG. 8 shows the EPR spectrum of an aqueous solution of SPAn2400 H at an ambient temperature according to one embodiment of the present invention.

FIG. 8 shows the EPR spectrum of an aqueous solution of SPAn2400 H at an ambient temperature, wherein the g value is 2.003 indicating a carbon radical; the peak-to-peak linewidth (ΔHpp) is 2.56 G; the spin density is $3.1 \times 10^{19}$ spin/g. The existence of free spin indicates that polarons exist in the aqueous solution of SPAn2400 H.

Embodiment III Fabrication and Property Analysis of a Polyaniline Derivative SPAn1800 Na Firstly, dissolve 0.30 g (0.83 mmol) PAn (polyaniline) in 30 ml NMP (N-Methyl-2-Pyrrolidone), and dissolve 0.83 g (8.3 mmol) SA (Succinic Anhydride) in 10 ml NMP, and dissolve 0.55 g (4.15 mmol) aluminum chloride in 10 ml NMP, wherein the mole ratio of aluminum chloride and SA is ½.

Next, gradually drip the NMP solution of aluminum chloride into the NMP solution of SA to undertake a reaction therebetween for 2 hours. Next, gradually drip the resultant solution into the NMP solution of polyaniline. Next, place the mixture solution in a supercritical reactor and undertake a reaction at a temperature of 50° C. and under a pressure of 1800 psig for 4 hours. Next, add the resultant solution into a 1 M aqueous solution of HCl and agitate the mixture solution. Next, filter the mixture solution to obtain a precipitate. Next, flush the precipitate with deionized water until the flushing water presents neutrality. Next, place the precipitate in a 1 M aqueous solution of NaOH to re-dissolve and undope the precipitate. Next, remove the residual precipitate from the resultant solution and dialyze the filtered solution with a dialysis membrane (Spectra/Por 3 membrane, molecular weight cutoff=3500) in deionized water. Thus is obtain a polyaniline derivative—poly[N-(sodium 1-tone-butyrate)] aniline, which is denoted by SPAn1800 Na. SPAn1800 Na is water-soluble, and the aqueous solution thereof has a blue color. After having been fabricated into a solid-state film, SPAn1800 Na has an electric conductivity of $1.9 \times 10^{-9}$ S/cm.

Similarly to Embodiment II, process an aqueous solution of SPAn1800 Na with a hydrogen ion exchange resin to replace sodium ion with hydrogen ion. At this time, the color of the aqueous solution, which is blue originally, becomes green. The condensed aqueous solution can be cast into a film or coated on a substrate. The film has an electric conductivity of $3.8 \times 10^{-5}$ S/cm, measured with a four-point probe method.

Embodiment IV Fabrication and Property Analysis of Polyaniline Derivatives MPAn2400 Na and MPAn2400 H Firstly, dissolve 0.30 g (0.83 mmol) PAn (polyaniline) in 30 ml NMP (N-Methyl-2-Pyrrolidone), and dissolve 0.81 g (8.3 mmol) MA (Maleic anhydride) in 10 ml NMP, and dissolve 0.55 g (4.15 mmol) aluminum chloride in 10 ml NMP, wherein the mole ratio of the aluminum chloride and the MA is ½. Next, gradually drip the NMP solution of aluminum chloride into the NMP solution of SA to undertake a reaction therebetween for 2 hours. Next, gradually drip the resultant solution into the NMP solution of polyaniline. Next, place the mixture solution in a supercritical reactor and undertake a reaction at a temperature of 50° C. and under a pressure of 2400 psig for 4 hours. Next, add the resultant solution into a 1 M aqueous solution of HCl and agitate the mixture solution. Next, filter the mixture solution to obtain a precipitate. Next, flush the precipitate with deionized water until the flushing water presents neutrality. Next, place the precipitate in a 1 M aqueous solution of NaOH to re-dissolve and undope the precipitate. Next, remove the residual precipitate from the resultant solution and dialyze the filtered solution with a dialysis membrane (Spectra/Por 3 membrane, molecular weight cutoff=3500) in deionized water. Thus is obtain a polyaniline derivative—poly[N-(sodium 1-tone-2-vinyl-butyrate)]aniline, which is denoted by MPAn2400 Na. MPAn2400 Na is water-soluble, and the aqueous solution thereof has a blue color. After having been fabricated into a solid-state film, MPAn2400 Na has an electric conductivity of $9.3 \times 10^{-10}$ S/cm.

Similarly to Embodiment II, process an aqueous solution of MPAn2400 Na with a hydrogen ion exchange resin to replace sodium ion with hydrogen ion. Thus is obtained a polyaniline derivative—poly[N-(1-tone-2-vinyl-butyric acid)]aniline, which is denoted by MPAn2400 H. At this time, the color of the aqueous solution, which is blue originally, becomes green. The condensed aqueous solution of MPAn2400 H can be cast into a film or coated on a substrate. The film of MPAn2400 H has an electric conductivity of $1.52 \times 10^{-4}$ S/cm, measured with a four-point probe method.

Figure 9:
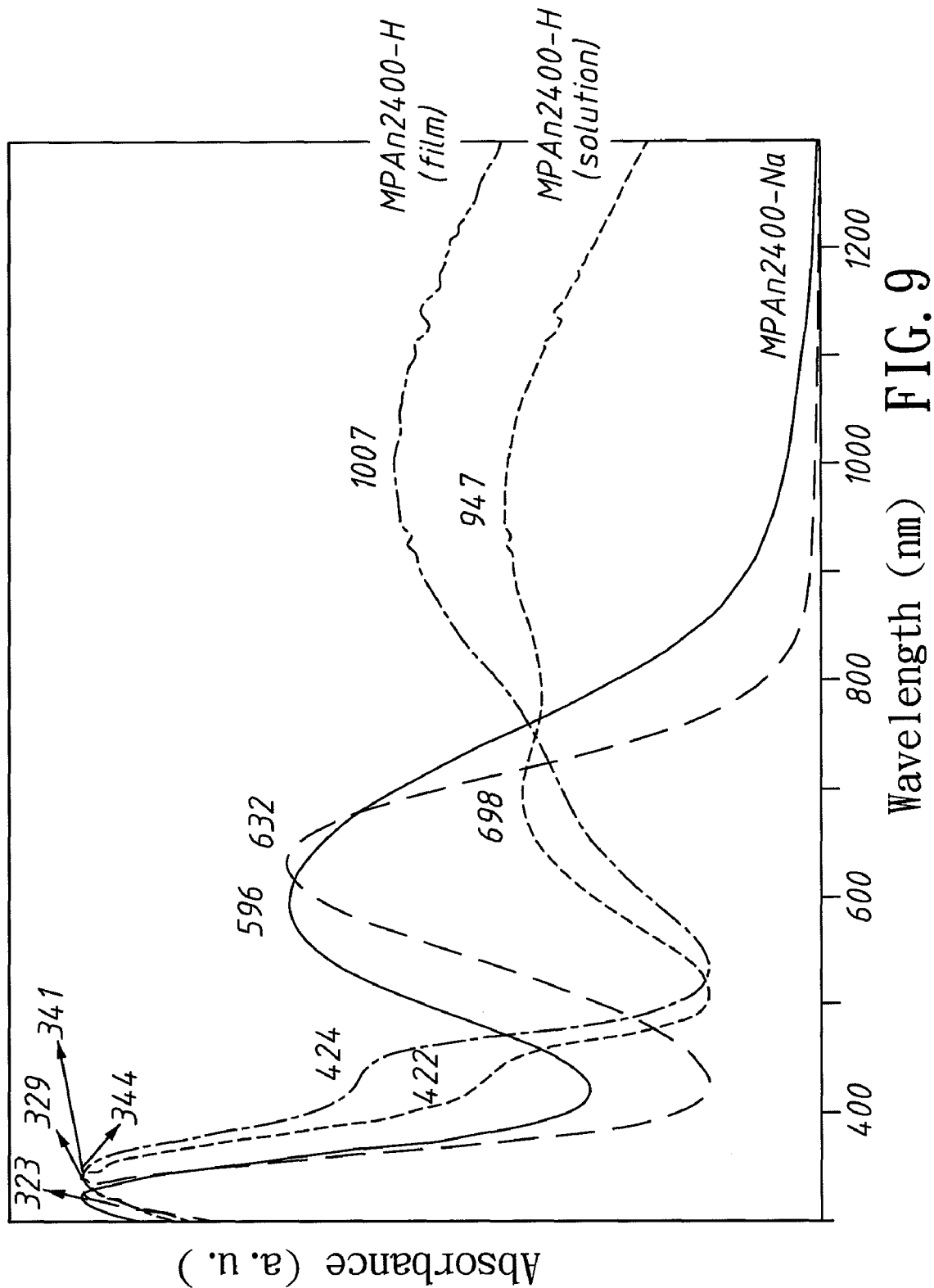
FIG. 9 shows the UV-VIS absorption spectra of polyaniline, MPAn2400 Na, and MPAn2400 H in different states according to one embodiment of the present invention.
Figure 10:
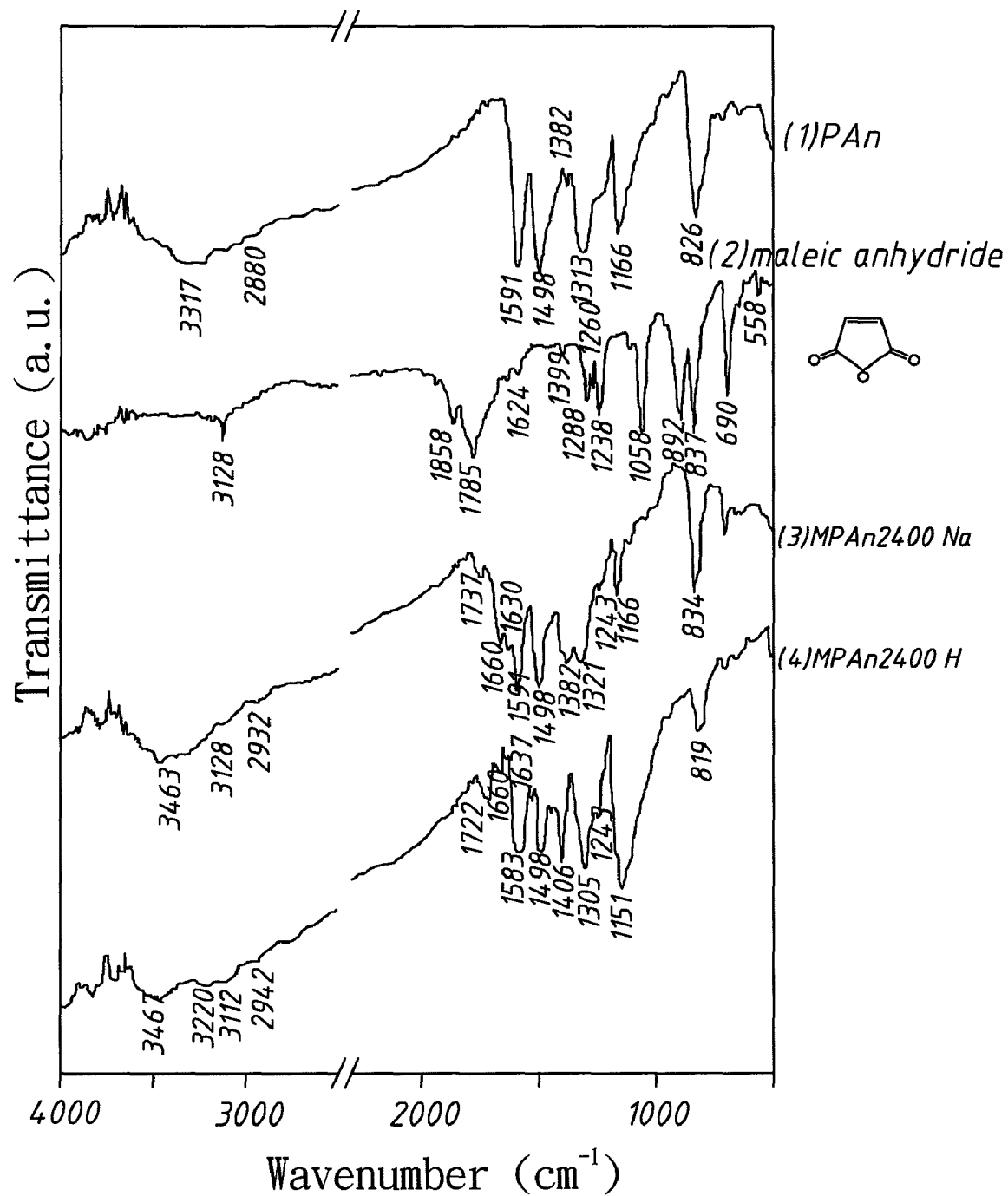
FIG. 10 shows the infrared spectra of polyaniline, MPAn2400 Na, and MPAn2400 H according to one embodiment of the present invention.

FIG. 9 shows the UV-VIS absorption spectra of polyaniline, MPAn2400 Na, and MPAn2400 H in different states. Curve (c) of FIG. 9 shows that there polaron band transition and bipolaron transition band respectively at 422 nm and 947 nm. Curve (d) of FIG. 9 shows that there polaron band transition and bipolaron transition band respectively at 424 nm and 1007 nm. FIG. 10 shows the infrared spectra of polyaniline(PAn), MPAn2400 Na, and MPAn2400 H. In Curve (4) of FIG. 10, there are stretching vibration of unsaturated C—H ($v_{C-H}$) at 3112 cm$^{-1}$, stretching vibration of C=O($v_{C=O}$) of —COOH at 1722 cm$^{-1}$, stretching vibration of C=O($v_{C=O}$) of

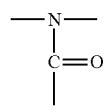

at 1660 cm$^{-1}$, stretching vibration of C=C($v_{C=C}$) of

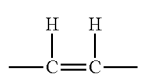

at 1637 cm$^{-1}$, and stretching vibration of C—O($v_{C-O}$) of —COOH at 1243 cm$^{-1}$, which indicate that the functional group

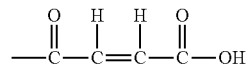

is indeed connected to the N of polyaniline. As polarons perform non-local movements in the backbone, the absorption peaks originally at 1591 cm$^{-1}$ shifts to a shorter wavelength—1583 cm$^{-1}$. Because of protonation, the characteristic peak originally at 1166 cm$^{-1}$ shifts to 1151 cm$^{-1}$ and becomes fatter. As there is no external dopant, it is proved to be a self acid doping caused by —COOH. The self acid doping is also proved by FIG. 9. The C—H out-of-plane deformation of the 1,4-disubstituted benzene ring at 826 cm$^{-1}$ indicates that the benzene ring of the polyaniline derivative modified by SA still has a 1,4-disubstitution without any addition reaction occurring in the benzene ring.

Figure 11:
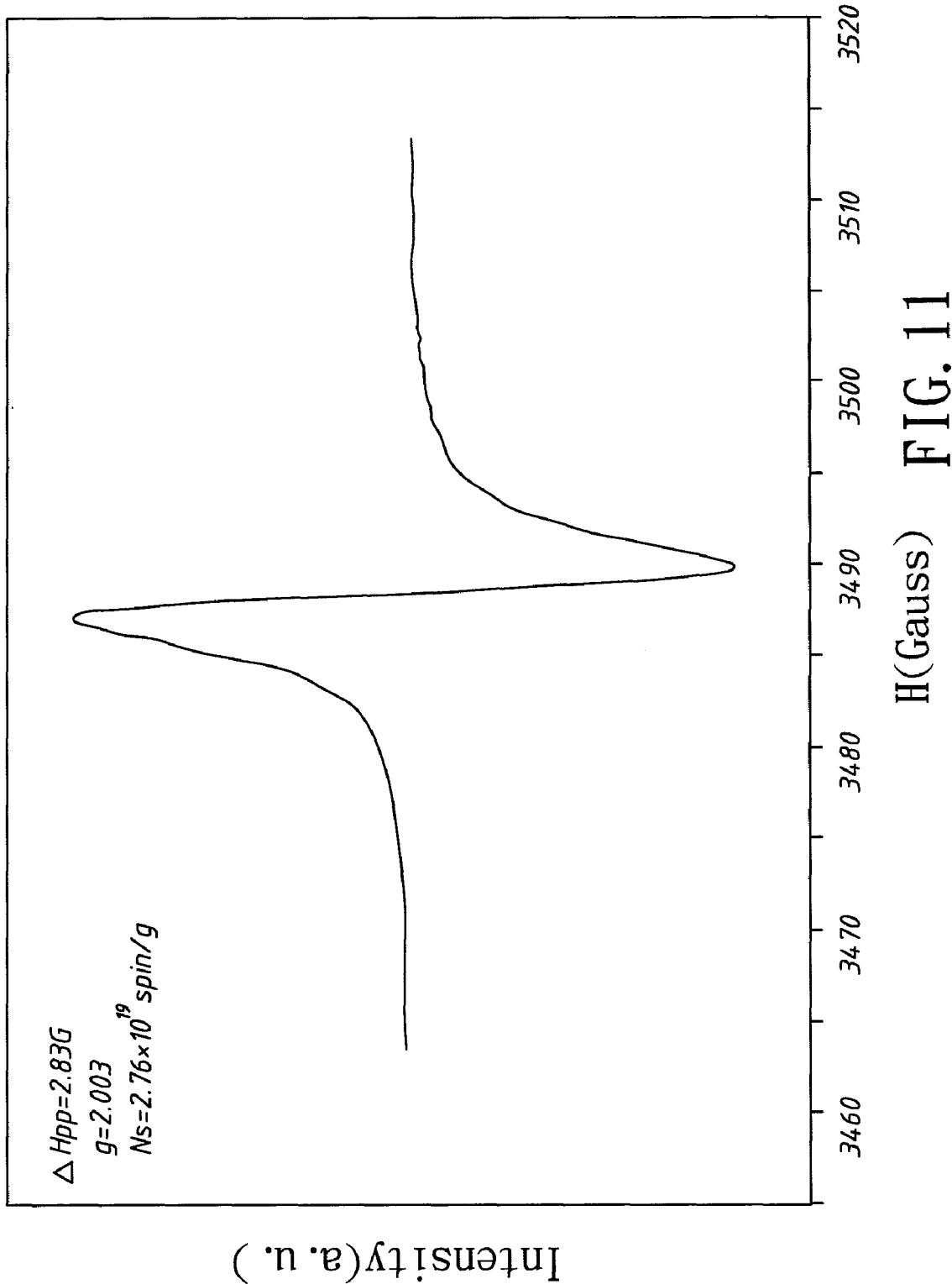
FIG. 11 shows the EPR spectrum of an aqueous solution of MPAn2400 H at an ambient temperature according to one embodiment of the present invention.

FIG. 11 shows the EPR spectrum of an aqueous solution of MPAn2400 H at an ambient temperature, wherein the g value is 2.003 indicating a carbon radical; the peak-to-peak linewidth (ΔHpp) is 2.83 G; the spin density (Ns) is $2.76 \times 10^{19}$ spin/g. The existence of free spin indicates that polarons exist in the aqueous solution of MPAn2400 H.

Figure 12:
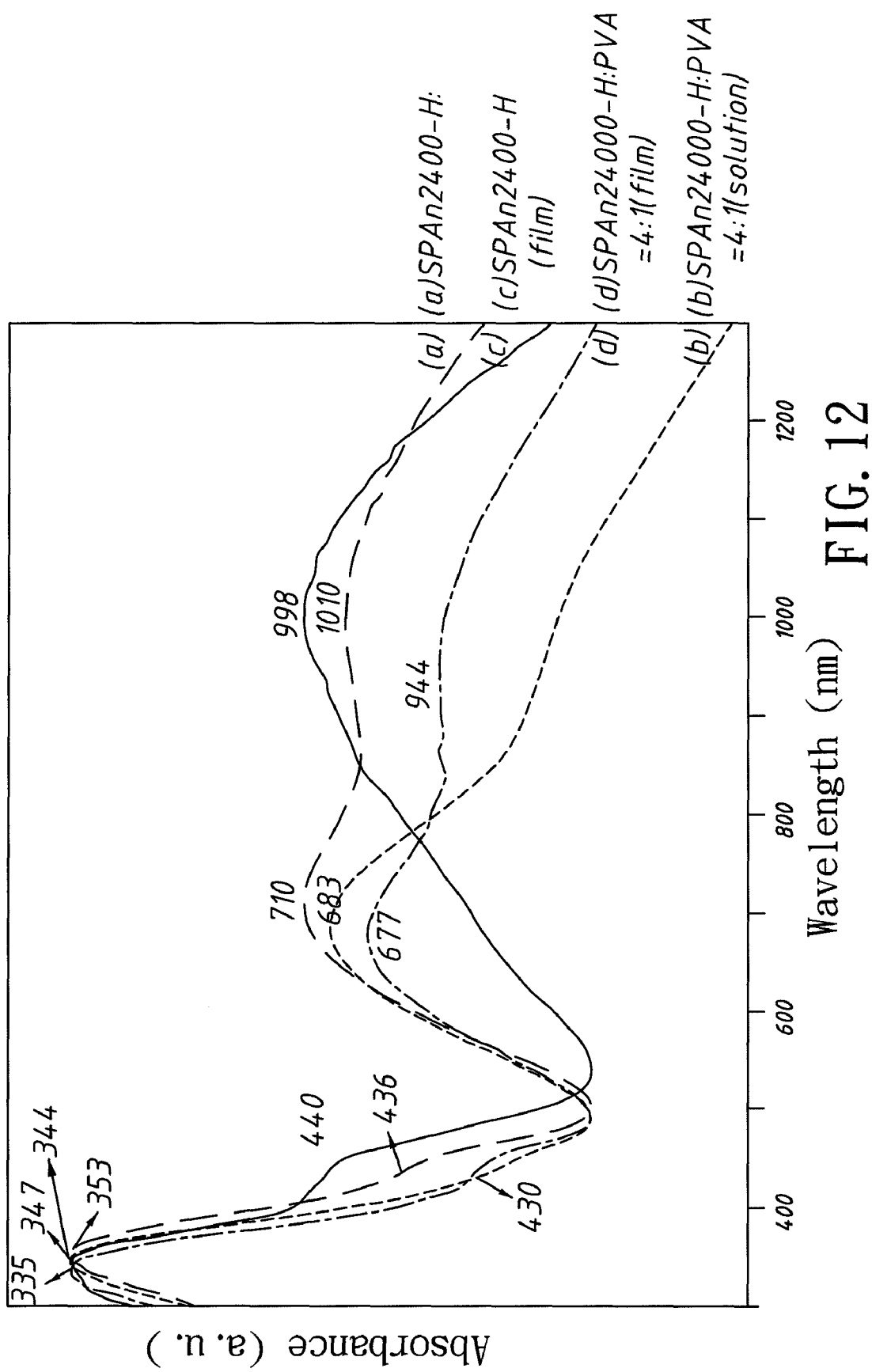
FIG. 12 shows the UV-VIS absorption spectra of the polyaniline derivative SPAn2400 H and the blend of PVA and SPAn2400 H in different states according to one embodiment of the present invention.

Embodiment V Fabrication and Property Analysis of a Blend Containing Polyaniline Derivative Blend of PVA and a Polyaniline Derivative Firstly, prepare a PVA (polyvinyl alcohol) aqueous solution having a concentration of 1.75 mg/ml and a SPAn2400 H aqueous solution having a concentration of 7 mg/ml. Next, mix 5 ml of the PVA aqueous solution with 5 ml of the SPAn2400 H aqueous solution and agitate the mixture solution. Then, the mixture solution is cast into a film or coated on a substrate to form a film. A test finds that the film has an electric conductivity of $1.76 \times 10^{-5}$ S/cm. FIG. 12 shows the UV-VIS absorption spectra of the polyaniline derivative and the blend in different states.

Blend of PEO and a Polyaniline Derivative

Figure 13:
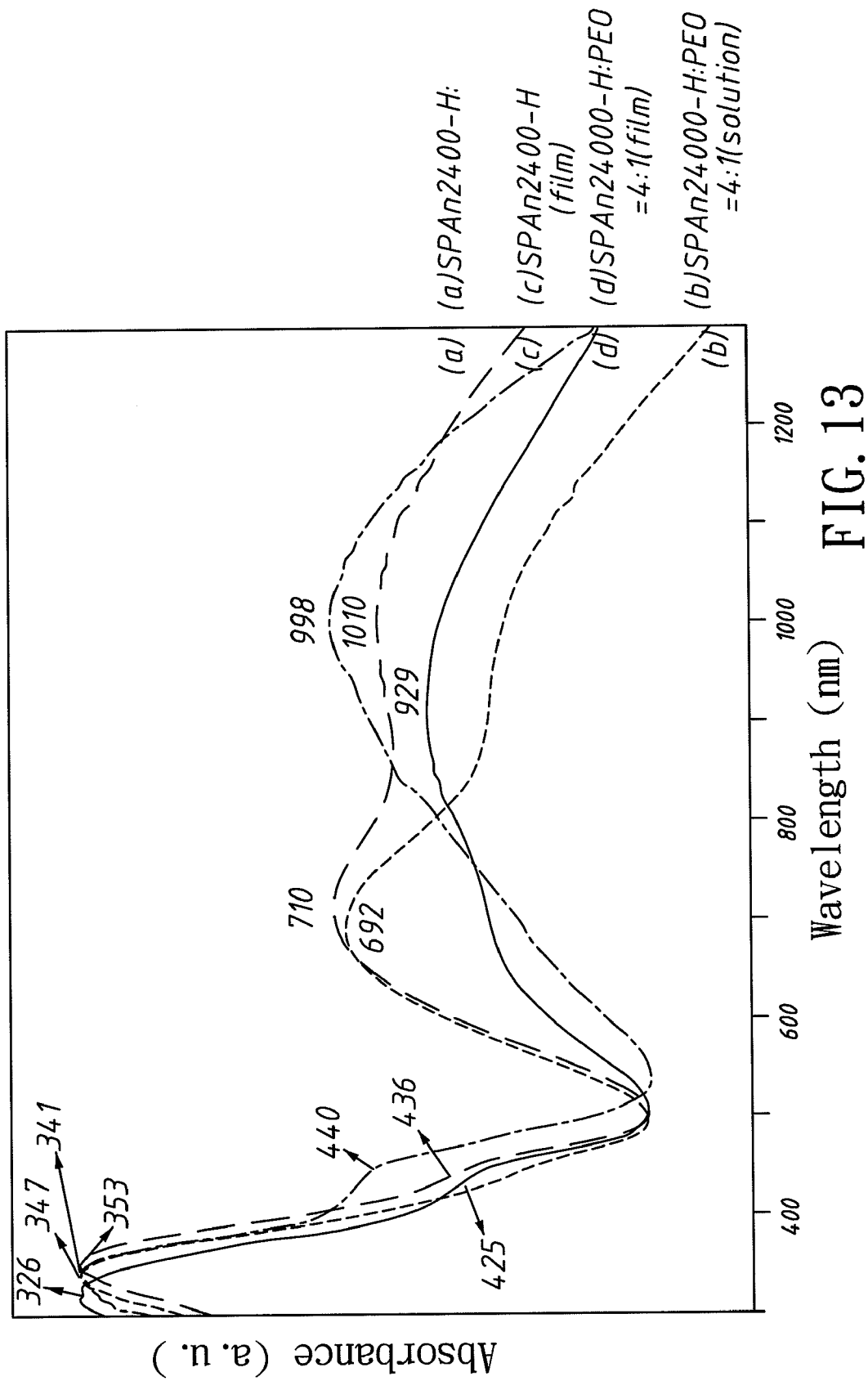
FIG. 13 shows the UV-VIS absorption spectra of the polyaniline derivative SPAn2400 H and the blend of PEO and SPAn2400 H in different states according to one embodiment of the present invention.

Firstly, prepare a PEO (polyethylene oxide) aqueous solution having a concentration of 1.75 mg/ml and a SPAn2400 H aqueous solution having a concentration of 7 mg/ml. Next, mix 5 ml of the PEO aqueous solution with 5 ml of the SPAn2400 H aqueous solution and agitate the mixture solution. Then, the mixture solution is cast into a film or coated on a substrate to form a film. A test finds that the film has an electric conductivity of $5.08 \times 10^{-5}$ S/cm. FIG. 13 shows the UV-VIS absorption spectra of the polyaniline derivative and the blend in different states.

Blend of PAA and a Polyaniline Derivative

Figure 14:
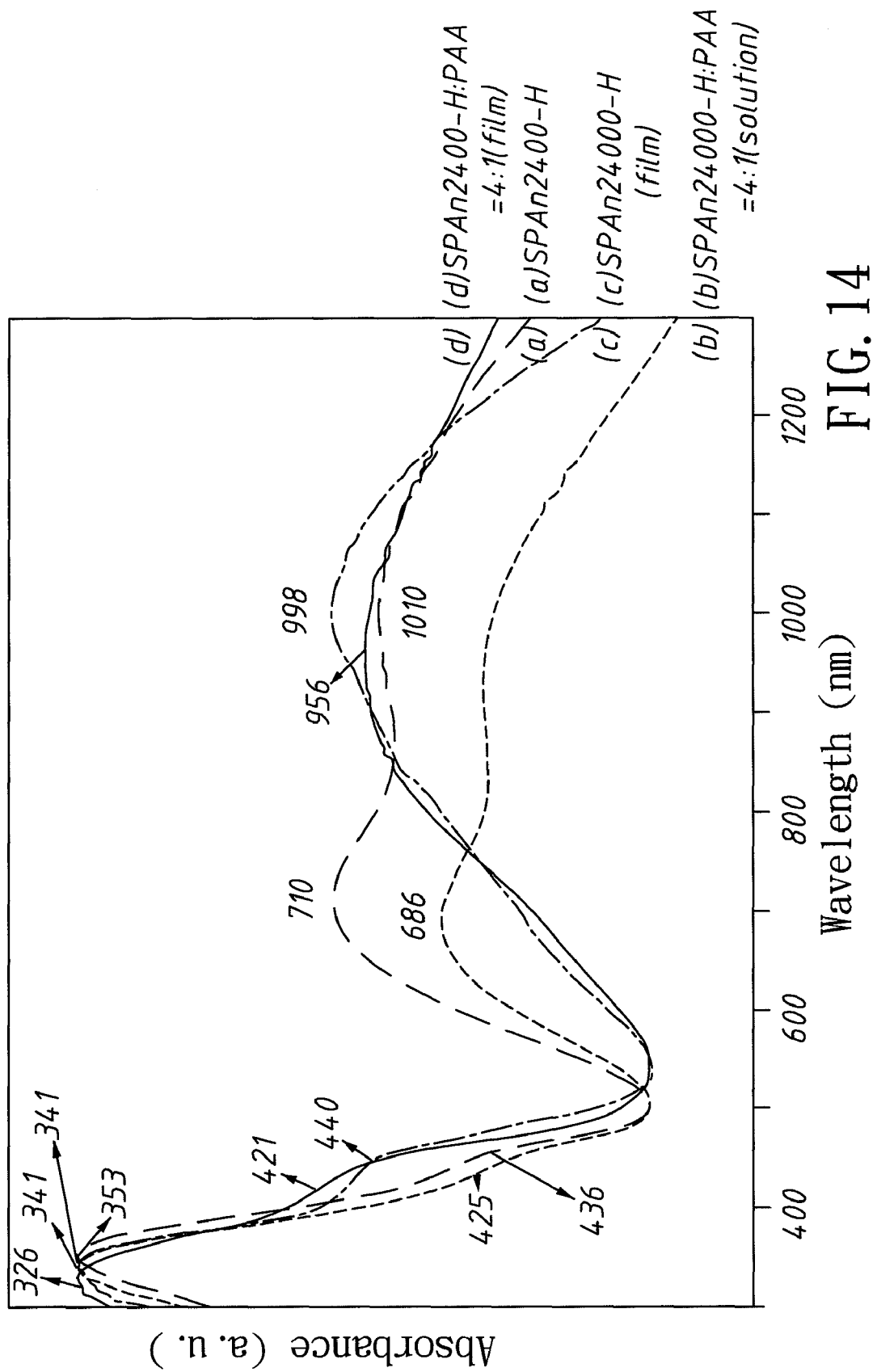
FIG. 14 shows the UV-VIS absorption spectra of the polyaniline derivative SPAn2400 H and the blend of PAA and SPAn2400 H in different states according to one embodiment of the present invention.

Firstly, prepare a PAA (polyacrylic acid) aqueous solution having a concentration of 1.75 mg/ml and a SPAn2400 H aqueous solution having a concentration of 7 mg/ml. Next, mix 5 ml of the PAA aqueous solution with 5 ml of the SPAn2400 H aqueous solution and agitate the mixture solution. Then, the mixture solution is cast into a film or coated on a substrate to form a film. A test finds that the film has an electric conductivity of $1.31 \times 1$ S/cm. FIG. 14 shows the UV-VIS absorption spectra of the polyaniline derivative and the blend in different states.

Embodiment VI Biotoxicity Test of a Blend Containing a Water-Soluble Self-Acid-Doped Polyaniline Derivative Perform a subculture of HEK 293 cells (Human Embryonic Kidney 293 cells) at a temperature of 37° C. and in an MEM culture solution containing 5% $CO_2$, 2.2 mg/mL sodium bicarbonate, 10% FBS (Fetal Brave Serum), 50 μg/mL gentamycin, 50 μg/mL penicillin, and 50 μg/mL streptomycin. Next, add 2 mL solution containing 0.2 mg/mL trypsin and 0.08 mg/mL EDTA into the subculture dish, and keep the subculture dish still for 2 minutes to let the cells separate from the dish wall. Next, process the solution with a centrifugal device at a rotation speed for 8 minutes. Next, disperse the HEK 293 cells in the MEM culture solution.

Place a SPAn2400 H/PAA blend in each well of a 96-well culture dish, and dry the SPAn2400 H/PAA blend for 24 hours and under a vacuum environment to form films. Use an ultraviolet lamp to disinfect the film. Add 1.5 ml of culture solution containing 5000 HEK 293 cells into each well of the 96-well culture dish, and cultivate the cells at a temperature of 37° C. and an environment containing 5% $CO_2$. Observe the cells one time each 24 hours. Take out the cells, and dye the cells with trypan blue for 5 minutes. Use a phase-difference optical microscope and a cytometer to count the surviving cells. Evaluate the biotoxicity of the material according to the number of the surviving cells.

Figure 15:
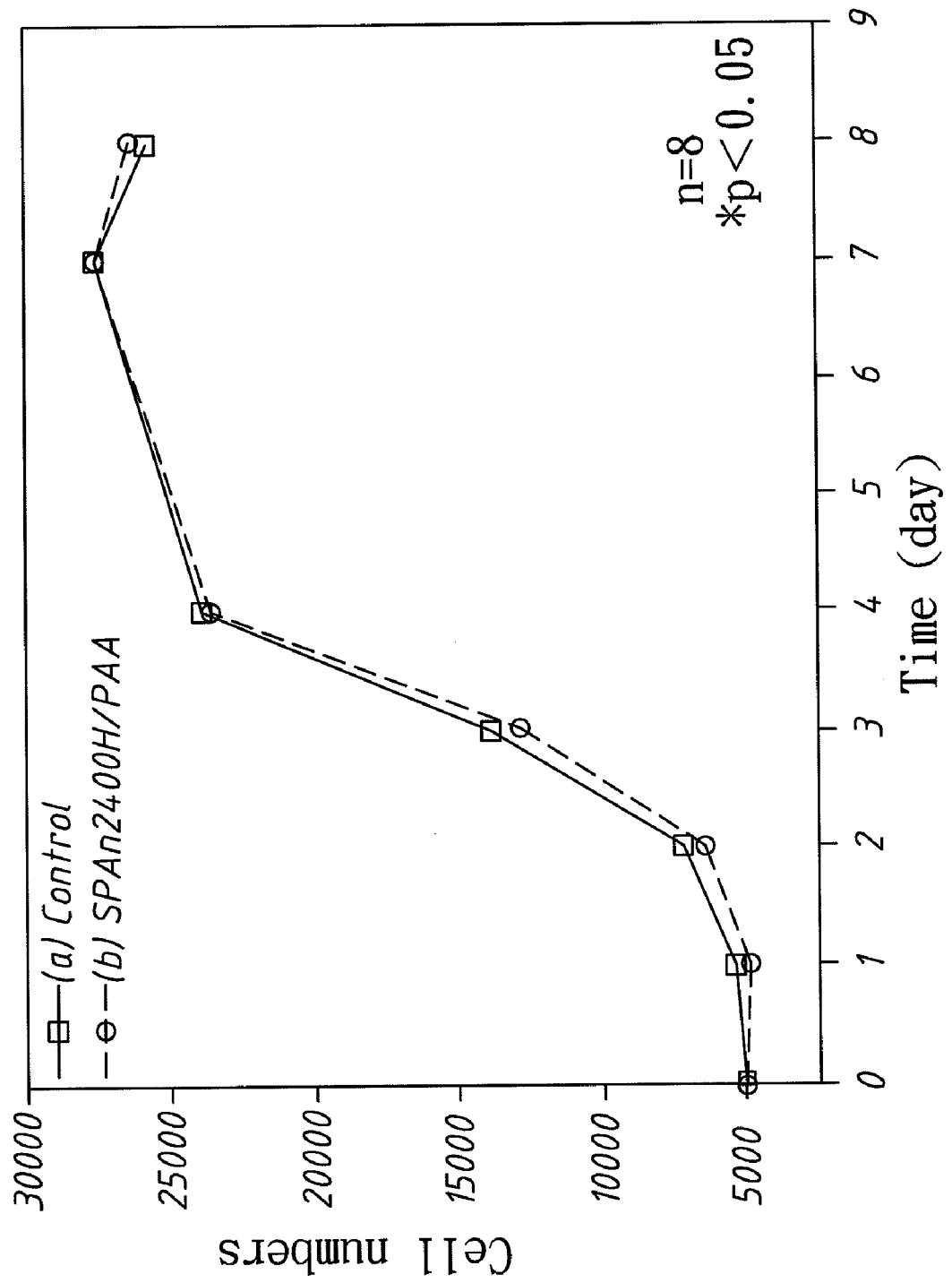
FIG. 15 shows the growth curves of a SPAn24H/PA blend and a control group in a biotoxicity test o according to one embodiment of the present invention.

FIG. 15 shows the growth curves from the first day to the eighth day in the biotoxicity test of a blend containing a water-soluble self-acid-doped polyaniline derivative. In the first day after the cells are placed on the film of a blend of SPAn2400 H/PAA, some of the cells die because the cells are still trying to adapt to the new environment. In the second day, the cells have adapted to the new environment and begin to grow and stick. In from the second day to the fourth day, the cells divide rapidly and multiply exponentially. After the fourth day, cell growth slows down because the nutrients in the culture medium have been insufficient to support rapid cell growth. Thus, the cells enter into a slow-growth stage until the seventh day. After the seventh day, neither space nor nutrients can further support the division and growth of the cells. Thus, the cells enter into the fading stage and begin to segregate and die. From the growth curves, it is known that the cell growth in the environment of SPAn2400 H/PAA is similar to that of the control group. Thus, the SPAn2400 H/PAA blend is proved to be free of biotoxicity.

Figure 16:
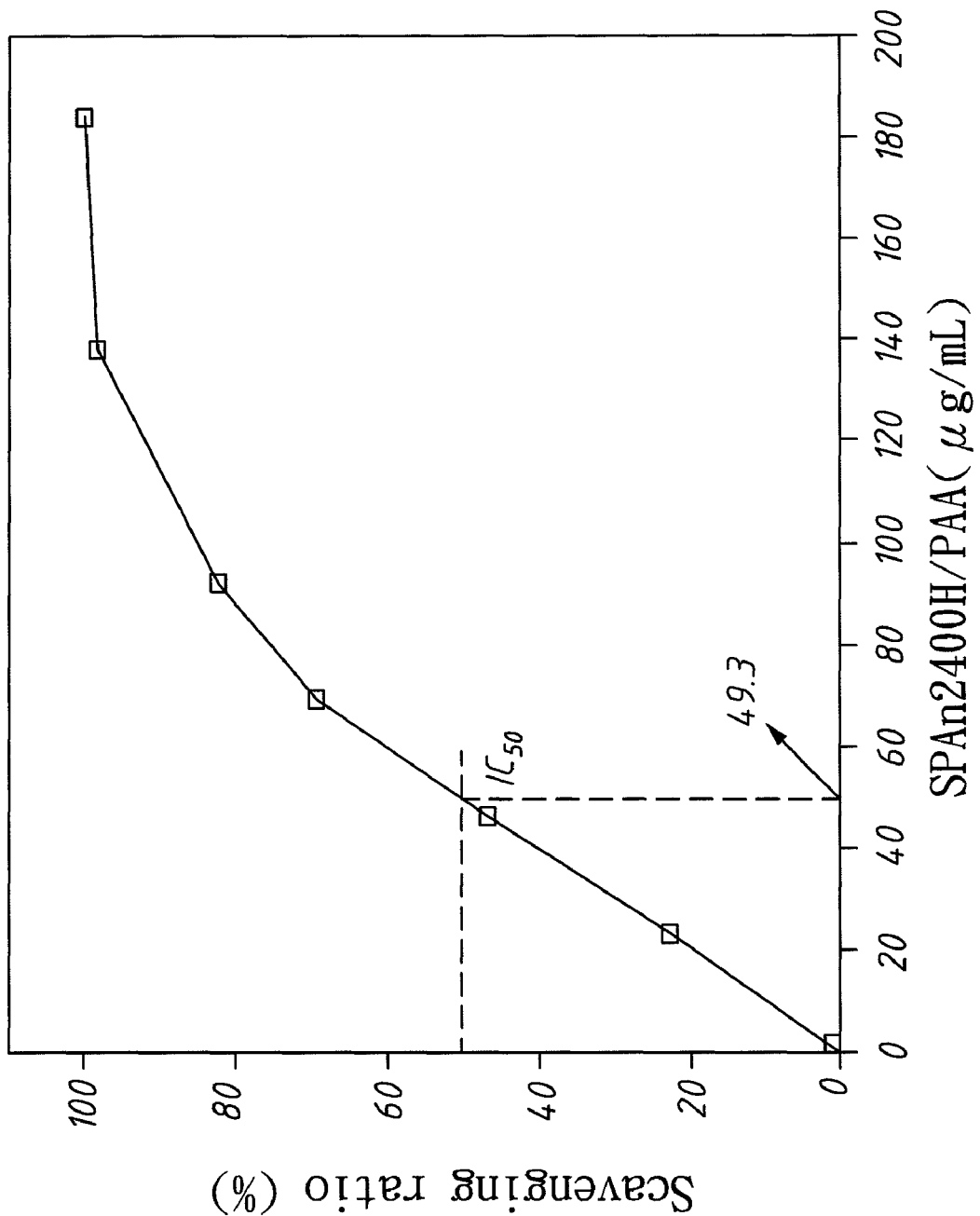
FIG. 16 shows the free radical-capture capability curve of a SPAn24H/PA blend according to one embodiment of the present invention.

Embodiment VII Test of Free Radical-Capture Capability of a Blend Containing a Water-Soluble Self-Acid-Doped Polyaniline Derivative Add 1 mL of different concentrations of SPAn2400 H/PAA blends into 5 mL of 250 μM DPPH solution and perform a light-proof reaction of the mixture solutions at an ambient temperature for 30 minutes. Use a UV-VIS near IR device to detect the 516 nm absorption intensities of the mixture solutions. Different concentrations of SPAn2400 H/PAA blends will eliminate different amounts of DPPH. Thus, there are different absorption intensities. The concentration required to eliminate 50% free radical ($IC_{50}$) can be worked out from the difference of absorption intensities. The value of $IC_{50}$ can be used to evaluate the free radical-capture capability. The lower $IC_{50}$, the higher the free radical-capture capability. Refer to FIG. 16. In this embodiment, the SPAn2400 H/PAA blend having a concentration of 49.3 μg/mL can eliminate 50% DPPH the free radical.

TABLE 1

Table 1 lists the electric conductivities of the water-soluble self-acid-doped polyaniline derivative and blend containing the same of the present invention.

| Polymer | Conductivity (S/cm) |
| --- | --- |
| SPAn2400 Na | $3.7 \times 10^{-9}$ |
| SPAn2400 H | $7.2 \times 10^{-4}$ |
| SPAn2400 H-PVA | $1.76 \times 10^{-6}$ |
| SPAn2400 H-PEO | $5.08 \times 10^{-5}$ |
| SPAn2400 H-PAA | $1.31 \times 10^{-4}$ |
| SPAn1800 Na | $1.9 \times 10^{-9}$ |

TABLE 1-continued

Table 1 lists the electric conductivities of the water-soluble self-acid-doped polyaniline derivative and blend containing the same of the present invention.

| Polymer | Conductivity (S/cm) |
| --- | --- |
| SPAn1800 H | $8.3 \times 10^{-6}$ |
| MPAn2400 Na | $3.8 \times 10^{-9}$ |
| MPAn2400 H | $1.52 \times 10^{-4}$ |

In conclusion, the present invention uses an environment-friendly and cost-efficient supercritical carbon dioxide method to synthesize water-soluble self-acid-doped polyaniline derivatives. The water-soluble self-acid-doped polyaniline derivatives of the present invention are highly water-soluble and easy to blend with another water-soluble polymer in water to form a polymeric blend, whereby the blend containing the water-soluble self-acid-doped polyaniline derivative of the present invention has improved properties (such as mechanical properties and adhesion), wherefore the present invention can be used as an electrostatic charge-proof material and an ESD (electrostatic discharge)-protection material. Further, the blend containing the water-soluble self-acid-doped polyaniline derivative of the present invention is free of biotoxicity and has free radical-capture capability. Therefore, the present invention can function as a conductive, biocompatible and anti-oxidation biomedical material.

Other Embodiments

Herein, it should be particularly mentioned that each characteristic disclosed in the specification is only an exemplification of the equivalent or similar characteristics of the present invention. A characteristic disclosed in the specification may be substituted by an approach having an identical, equivalent or similar objective, but the substitute is still within the scope of the present invention. A characteristic disclosed in the specification may combine with another method, but the combination is regarded as not departing from the scope of the present invention.

The present invention has been described with the above-mentioned embodiments. However, these embodiments are only to exemplify the present invention but not to limit the scope of the present invention. Any equivalent modification or variation according to the spirit of the present invention is to be also included within the scope of the present invention.

What is claimed is:

1. A water-soluble self-acid-doped polyaniline blends, comprising 70-90 percent by weight of a polyaniline derivative; and 10-30 percent by weight of at least one water-soluble polymer, wherein said polyaniline derivative has a structure expressed by Formula (I):

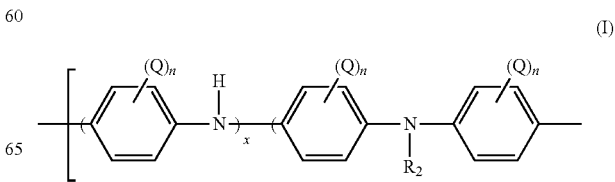

-continued

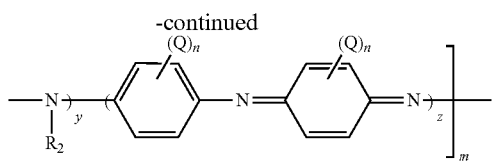

wherein m is a natural number, and
wherein n is a positive integer of from 1 to 4, and
wherein x, y or z is 0 or 1 independently in each of m pieces of substructures of Formula (I), and
wherein x, y and z cannot not be 0 simultaneously in each of said m pieces of substructures, and
wherein y is 1 in at least one of said m pieces of substructures, and
wherein Q is selected from the group consisting of fluorine, chlorine, bromine, —$OR_1$, —$COR_1$, —$OCOR_1$, —$NHCOR_1$, —$NO_2$, —CN and —COOH, and
wherein $R_1$ is a $C_1$-$C_4$ alkyl group, and
wherein $R_2$ is a functional group expressed by Formula (II):

(II)

wherein A is a substituted or unsubstituted $C_1$-$C_4$ alkylidene group, and
wherein M is selected from the group consisting of hydrogen, lithium, sodium, potassium and $NH_4^+$.

2. The water-soluble self-acid-doped polyaniline blends according to claim 1, wherein said polyaniline derivative is preferred to has a concentration of 75-85 percent by weight, and said water-soluble polymer is preferred to have a concentration of 15-25 percent by weight.

3. The water-soluble self-acid-doped polyaniline blends according to claim 1, wherein said "A" is a substituted or unsubstituted $C_2$ or $C_3$ alkylidene group.

4. The water-soluble self-acid-doped polyaniline blends according to claim 1, wherein said water-soluble polymer is polyvinyl alcohol, polyethylene oxide or polystyrene.

5. The water-soluble self-acid-doped polyaniline blends according to claim 1, wherein said polyaniline derivative is fabricated with following steps:
   a) taking an intramolecular acid anhydride compound to react with a Lewis acid to form a dual-carboxyl compound;
   b) placing polyaniline and said dual-carboxyl compound, which is obtained in said step a), in supercritical carbon dioxide, and letting said polyaniline reacts with said dual-carboxyl compound in said supercritical carbon dioxide;
   c) processing a product of said step b) with a proton acid aqueous solution to form a precipitate;
   d) re-dissolving and filtering said precipitate, which is obtained in said step c), with a basic solution, to obtain a filtered solution;
   e) desalting said filtered solution obtained in said step d);
   f) processing said filtered solution, which has been desalted in said step e), with a hydrogen ion exchange resin; and
   g) removing water from said filtered solution, which has been processed in said step f), to obtain said polyaniline derivative.

6. The water-soluble self-acid-doped polyaniline blends according to claim 1, wherein said polyaniline derivative is a water-soluble self-acid-doped polyaniline derivative.

* * * * *